United States Patent [19]

Itoh et al.

[11] Patent Number: 5,519,088

[45] Date of Patent: May 21, 1996

[54] HARDENABLE COMPOSITION, AQUEOUS GEL AND APPLICATIONS THEREOF

[75] Inventors: Hiroshi Itoh, Kamakura; Takashi Abe, Yokohama; Hideo Kamio, Odawara; Hitoshi Yamashita; Atsuhiko Nitta, both of Yokohama, all of Japan

[73] Assignee: Mitsui Toatsu Chemicals, Incorporated, Tokyo, Japan

[21] Appl. No.: 320,786

[22] Filed: Oct. 11, 1994

Related U.S. Application Data

[63] Continuation of Ser. No. 913,710, Jul. 16, 1992, abandoned.

[30] Foreign Application Priority Data

Jul. 18, 1991 [JP] Japan ..................... 3-178230

[51] Int. Cl.[6] ..................................... C08K 3/10
[52] U.S. Cl. ..................... 524/812; 524/407; 524/413; 524/430; 524/431; 524/433; 524/436; 524/437; 524/442
[58] Field of Search ..................... 524/812, 813, 524/438, 431, 433, 432, 437, 442, 413, 407

[56] References Cited

U.S. PATENT DOCUMENTS

| | | |
|---|---|---|
| 4,106,944 | 8/1978 | Epstein ..................... 524/444 |
| 4,337,182 | 6/1982 | Crisp et al. ..................... 524/5 |
| 4,718,899 | 1/1988 | Itoh et al. |
| 4,729,834 | 3/1988 | Itoh et al. |
| 5,155,191 | 10/1992 | Itoh et al. |

FOREIGN PATENT DOCUMENTS 0406432  1/1991   European Pat. Off.

OTHER PUBLICATIONS

Chemical Abstracts, vol. 76, No. 2, Jan. 10, 1972, AN 4491, T. Nakaoka, et al. "Polyacryl–Amide Containing Colloidal Silicic Acid".

*Primary Examiner*—Jeffrey T. Smith
*Attorney, Agent, or Firm*—Oblon, Spivak, McClelland, Maier & Neustadt

[57] ABSTRACT

The present invention provides an aqueous gel comprising a polymer of (meth)acrylamide or particular (meth)acrylamide derivative(s), particulate metal oxide(s) and an aqueous medium, a process for producing said gel, and products utilizing said gel.

This aqueous gel can be produced so as to have transparency, has fire resistance and can prevent the spreading of flames, and is highly elastic. The aqueous gel, when produced as a transparent gel, becomes cloudy when heated or cooled and is useful for the shielding of heat rays or cold radiation.

11 Claims, No Drawings

HARDENABLE COMPOSITION, AQUEOUS GEL AND APPLICATIONS THEREOF

This application is a continuation of application Ser. No. 07/913,710, filed on Jul. 16, 1992, now abandoned.

BACKGROUND OF THE INVENTION (a) Field of the Invention

The present invention relates to a hardenable composition, an aqueous gel and applications of said gel, and particularly to a hardenable composition, an aqueous gel, a thermosensitive plate-shaped composite material, a fire-resistant plate-shaped composite material, a water-absorbable composition and processes for producing them.

More particularly, the present invention relates to a hardenable composition comprising (meth)acrylamide or (meth)acrylamide derivative(s), particulate metal oxide(s) and an aqueous medium; an aqueous gel obtained by curing said composition and a process for producing the gel; a thermosensitive plate-shaped composite material and a fire-resistant plate-shaped composite material both comprising two or more transparent plates and an aqueous gel interposed between them, and processes for producing the composite materials; and a water-absorbable composition.

(b) Description of the Prior Art

It has been attempted to use aqueous gels to various applications for their water-holding ability. However, the applications have been virtually limited mostly to a sanitary field and the applications to other fields have been insufficient. Various reasons are considered for that. For example, when it is aimed to apply an aqueous gel as a fire-resistant material in view of the non-flammability and fire extinguishability of water, the gel has no sufficient flame resistance; accordingly, the actual use of aqueous gel as such a material is not realized. Also when it is aimed to apply an aqueous gel as a water-absorbable material (e.g. water-stopping agent), the gel itself has no elasticity and is fragile; therefore, the use of aqueous gel to such an application is limited to special fields.

In order to improve the above situation, various attempts were made. With respect to the fire-resistant material, Japanese Patent Publication No. 24063/1985 proposed a fire-resistant glass comprising glass plates and an aqueous gel consisting of a polymer of an acrylic acid derivative and a water-soluble silicate (e.g. soluble glass), interposed between the glass plates.

The aqueous gel can exhibit an intended fire-resistant property in a required thickness; however, the thickness must be large because the fire resistance of the aqueous gel is exhibited by the water boiling caused by heating and consequent foaming of gel. This large thickness poses a big restriction when the aqueous gel is used for applications other than fire wall.

Further, the above aqueous gel uses a water-soluble silicate and is strongly alkaline; hence, for example, when the glass plates are broken, there occurs the leakage of a strongly alkaline substance, bringing about a highly dangerous state. Moreover, the strongly alkaline substance acts on the polymer of an acrylamide derivative which is a constituent of the gel, causing the deterioration of the polymer.

Japanese Patent Application Kokai (Laid-Open) No. 91446/1987 proposed addition of a corrosion-resistant substance to a water-soluble salt. Japanese Patent Application Kokai (Laid-Open) No. 264942/1989 proposed combined use of a polyvinyl alcohol gel and a water-soluble salt. These approaches, however, provide no sufficient fire resistance. Further, in the latter approach, the operation of sealing a low-fluidity gel in between glass plates poses a big problem in production of fire resistant material.

Further, there were developed various aqueous gels of high elasticity, for example, a gel of a vinyl alcohol/acrylic acid copolymer which is a saponification product between methyl acrylate and vinyl acetate and a gel of an isobutylene-maleic anhydride copolymer. These aqueous gels of high elasticity, however, give no sufficient results.

There is known, in U.S. Pat. No. 4,828,710, a resin for adsorption of water or useful substances, consisting of a polymer of an N-alkyl or N-alkylene-substituted (meth)acrylamide or a copolymer of said monomer with other monomer copolymerizable therewith. There is also known a material comprising a carrier (e.g. silica) and the above resin supported thereon.

Further, it is known in European Patent No. 406432 that a spherical (bead-like) polymer obtained by polymerizing the above-mentioned monomer in a concentrated aqueous inorganic salt solution containing fine inorganic particles in a suspended form and then precipitating the resulting polymer by salting out, is useful for concentration of easily degrading substances (e.g. amino acids, proteins) or as a substrate capable of slowly releasing mediciens, etc.

OBJECTS AND SUMMARY OF THE INVENTION

The present invention is intended to solve the above-mentioned problems of the prior art.

The present inventors made study on the above problems. As a result, it was found that an aqueous gel comprising a polymer of (meth)acrylamide or particular (meth)acrylamide derivative(s), particulate metal oxide(s) and an aqueous medium can have transparency, can stop the spreading of flames and can have a high elasticity. It was further found that said transparent gel, when heated or cooled, gets cloudy and is useful for the shielding of heat rays or cold radiation. It was furthermore found that by polymerizing (meth)acrylamide or particular (meth)acrylamide derivative(s) in the presence of particulate metal oxide(s) suspension between two or more transparent plates, a transparent gel can be easily formed and fixed between the transparent plates with a high adhesion between the gel and the plates, whereby a fire-resistant plate-shaped composite material or a thermosensitive plate-shaped composite material can be produced at a high efficiency. The above finding has led to the completion of the present invention.

According to the present invention, there are provided a hardenable composition comprising (1) (meth)acrylamide or (meth)acrylamide derivative(s) [(meth)acrylamide or the derivative(s) is (are) hereinafter referred to as particular (meth)acrylamide derivative(s)] each represented by the following general formula (I) or (II)

wherein $R_1$ represents a hydrogen atom or a methyl group, $R_2$ represents a hydrogen atom, a methyl group or an ethyl group, and $R_3$ represents a hydrogen atom, a methyl group, an ethyl group or a propyl group,

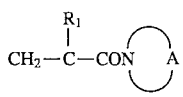

(II)

wherein $R_1$ represents a hydrogen atom or a methyl group, and A represents $-(CH_2)_n-$ (n is 4 to 6) or $-(CH_2)_2-O-(CH_2)_2-$, (2) particulate metal oxide(s) and (3) an aqueous medium;

an aqueous gel comprising a polymer of particular (meth)acrylamide derivative(s), particulate metal oxide(s) and an aqueous medium;

a process for producing an aqueous gel, which comprises polymerizing particular (meth)acrylamide derivative(s) in an aqueous medium containing particulate metal oxide(s) in a suspended form;

a process for producing a transparent aqueous gel, which comprises polymerizing particular (meth)acrylamide derivative(s) in an aqueous medium of pH 7–13 containing particulate metal oxide(s) in a suspended form;

a water-absorbable composition obtained by drying said aqueous gel;

a thermosensitive plate-shaped composite material or a fire-resistant plate-shaped composite material, each comprising two or more transparent plates and said aqueous gel interposed between the plates, and a coating composition containing said aqueous gel as the main component.

The particular (meth)acrylamide derivative(s) used in the present invention is (are) N-alkyl- or N-alkylene-substituted or unsubstituted (meth)acrylamides represented by the above general formula (I) or (II). Specific examples thereof are acrylamide, methacrylamide, N-methylacrylamide, N-methylmethacrylamide, N-ethylacrylamide, N,N-dimethylacrylamide, N,N-dimethylmethacrylamide, N,N-diethylacrylamide, N-ethylmethacrylamide, N-methyl-N-ethylacrylamide, N-isopropylacrylamide, N-n-propylacrylamide, N-isopropylmethacrylamide, N-n-propylmethacrylamide, N-acryloylpyrrolidine, N-methacryloylpyrrolidine, N-acryloylpiperidine, N-methacryloylpiperidine, N-acryloylhexahydroazepine, N-acryloylmorpholine and N-methacryloylmorpholine.

Of the above monomers, those capable of giving a polymer showing thermosensitivity in an aqueous solution, i.e. a polymer which is hydrophilic at low temperatures but turns hydrophobic when heated, are exemplified by N-ethylacrylamide, N-methyl-N-ethylacrylamide, N,N-diethylacrylamide, N-ethylmethacrylamide, N-n-propylacrylamide, N-methyl-N-ethylmethacrylamide, N-n-propylmethacrylamide, N-acryloylpyrrolidine, N-methacryloylpyrrolidine, N-acryloylpiperidine and N-methacryloylpiperidine. Each of these monomers is useful as a material for an aqueous gel used in production of a thermosensitive plate-shaped composite material.

The monomer useful as a material for an aqueous gel used in production of a fire-resistant plate-shaped composite material, is a monomer containing at least one monomer capable of giving a polymer showing thermosensitivity in an aqueous solution.

The monomer constituting the composition of the present invention must contain at least one of the above-mentioned monomers. The present composition may contain, besides said monomer(s), at least one monomer selected from crosslinkable monomers, hydrophilic monomers, ionic monomers and hydrophobic monomers, examples thereof being shown below.

The crosslinkable monomers can be monomers having two or more unsaturated bonds in the molecule, and monomers such as N-alkoxymethyl(meth)acrylamide derivatives which, after being subjected to polymerization, can form a crosslinked structure by a post-treatment such as heating.

Examples of the crosslinkable monomers belonging to the former group are N,N'-methylenebisacrylamide, N,N-diallylacrylamide, triacrylformal, N,N-diacryloylimide, N,N-dimethacryloylimide, ethylene glycol acrylate, ethylene glycol dimethacryalte, polyethylene glycol diacrylates, polyethylene glycol dimethacrylates, propylene glycol diacrylate, propylene glycol dimethacrylate, polypropylene glycol diacrylates, polypropylene glycol dimethacrylates, 1,3-butylene glycol diacrylate, 1,3-butylene glycol dimethacrylate, 1,4-butylene glycol dimethacrylate, glycerol dimethacrylate, neopentyl glycol dimethacrylate, trimethylolpropane triacrylate, trimethylolpropane trimethacrylate, trimethylolethane trimethacrylate, trimethylolethane triacrylate, tetramethylolmethane tetramethacrylate, tetramethylolmethane triacrylate, divinylbenzene, diallyl phthalate, urethane (meth)acrylate, polyester (meth)acrylate and epoxy acrylate.

Examples of the N-alkoxymethyl(meth)acrylamide derivatives belonging to the latter group are N-methylol(meth)acrylamide, N-methoxymethyl(meth)acrylamide and N-tertbutoxymethyl(meth)acrylamide and include even N-hydroxymethyl(meth)acrylamide.

Examples of the hydrophilic monomers are diacetoneacrylamide, hydroxyethyl methacrylate, hydroxyethyl acrylate, hydroxypropyl methacrylate, hydroxypropyl acrylate, methoxypolyethylene glycol (meth)acrylates and N-vinyl-2-pyrrolidone. It is possible to use vinyl acetate, glycidyl methacrylate or the like as a copolymerizable monomer and hydrolyze the resulting copolymer to impart hydrophilicity.

Examples of the ionic monomers are acids such as acrylic acid, methacrylic acid, itaconic acid, vinylsulfonic acid, allylsulfonic acid, methallylsulfonic acid, styrenesulfonic acid, 2-acrylamide-2-phenylpropanesulfonic acid, 2-acrylamide- 2-methyl-propanesulfonic acid, (meth)acrylate of ethylene oxide-modified phosphoric acid and the like, and salts thereof; and amines such as N,N-dimethylaminoethyl methacrylate, N,N-diethylaminoethyl methacrylate, N,N-dimethylaminoethyl acrylate, N,N-dimethylaminopropylmethacrylamide, N,N-dimethylaminopropylacrylamide and the like, and salts thereof. It is possible to use an acrylate, a methacrylate, acrylamide, methacrylamide, acrylonitrile or the like as a copolymerizable monomer and hydrolyze the resulting copolymer to impart ionicity.

Examples of the hydrophobic monomers are N-alkyl(meth)acrylamide derivatives such as N,N-di-n-propylacrylamide, N-n-butylacrylamide, N-tert-butylacrylamide, N-n-hexylacrylamide, N-n-hexylmethacrylamide, N-n-octylacrylamide, N-n-octylmethacrylamide, N-tert-octylacrylamide, N-dodecylacrylamide, N-n-dodecylmethacrylamide and the like; N-(ω-glycidoxyalkyl)(meth)acrylamide derivatives such as N,N-diglycidylacrylamide, N,N-diglycidylmethacrylamide, N-(4-glycidoxybutyl)acrylamide, N-(4-glycidoxybutyl)methacrylamide, N-(5-glycidoxypentyl)acrylamide, N-(6-glycidoxyhexyl)acrylamide and the like; (meth)acrylate derivatives such as ethyl acrylate, methyl methacrylate, butyl methacrylate, butyl acrylate, lauryl acrylate, 2-ethylhexyl methacrylate, glycidyl methacrylate and the like; acrylonitrile; methacrylonitrile; vinyl acetate; vinyl chloride; vinylidene chloride; olefins such as ethylene, propylene, butene and the like; styrene; divinylbenzene; α-methylstyrene; butadiene; and isoprene.

The amount proportions of the (meth)acrylamide derivative(s) and other monomer mentioned above differ depending upon their combination and cannot be specified. However, the amount of the crosslinkable monomer in the total monomers is generally 10% by weight or less, preferably 5% by weight or less, more preferably 3% by weight or less. The amount of the hydrophilic or ionic monomer in the total monomers is 90% by weight or less, preferably 80% by weight or less, more preferably 70% by weight or less. The amount of the hydrophobic monomer in the total monomers is 40% by weight or less, preferably 20% by weight or less, more preferably 10% by weight or less.

The combination of monomers used differ depending upon the application of the gel to be produced. For example, when it is desired to endow the gel with water absorbability as high as possible in order to use the gel as a water-absorbable composition, there can be selected a hydrophilic monomer such as acrylamide, methacrylamide, N,N-dimethylacrylamide or the like and the ionic monomer mentioned above, whereby higher water absorbability can be obtained. When it is desired to endow the gel with hydrophobicity, there can be used a hydrophobic monomer, or there can be used a crosslinkable monomer at a higher proportion, whereby lower water absorbability can be obtained.

Next, description is made on the particulate metal oxide(s) which is (are) another constituent of the aqueous gel of the present invention. The term "particulate" refers to such a particle diameter as the metal oxide is dispersed in an aqueous solution and is in a colloidal state. Such a particle diameter differs depending upon the type of the metal oxide(s) used but is generally 20 μm or less, preferably 10 μm or less, more preferably 0.001–5 μm.

In producing a transparent aqueous gel, the particle diameter of the particulate metal oxide(s) is a very important factor and is required to be 1 μm or less, preferably 0.5 μm or less, more preferably 0,001–0.1 μm.

In the present invention, the particulate metal oxide(s) can be any as long as it (they) is (are) particulate and water-insoluble. The particulate metal oxide(s) preferably has (have), in an aqueous solution, such a surface as to take at least partially the form of a hydroxyl group. In an extreme case, the particulate metal oxide(s) may have, in an aqueous solution, surface parts covered with hydroxyl groups. Examples of the particulate metal oxide(s) are silicon dioxide, aluminum oxide, antimony oxide, titanium oxide, indium oxide, tin oxide, zirconium oxide, lead oxide, iron oxide, calcium silicate, calcium oxide, magnesium oxide and compound oxides thereof. Of these, preferred are silicon dioxide (silica), aluminum oxide (alumina), antimony oxide and compound oxides thereof because they have a large number of hydroxyl groups at the surfaces. They are called, in some cases, colloidal silica, white carbon, alumina sol and antimony sol.

In producing silicon dioxide, there can be employed, for example, a dry process which comprises pyrolysis of silicon tetrachloride; a wet process which comprises precipitation by double decomposition of sodium silicate with an acid, carbon dioxide, an ammonium salt or the like; and an aerogel process which comprises heating an organic liquid (e.g. alcohol) and silica gel in an autoclave. When silicon dioxide is used as a particulate metal oxide, it can be used as an aqueous suspension or as a dry powder. The aqueous suspension may be an acidic suspension or an alkaline suspension, but an alkaline suspension is preferred.

In producing aluminum oxide, there can be used various processes such as heating and dehydration of hydroxide, reaction of sodium aluminate with carbon dioxide or sulfur dioxide, addition of alkaline substance to aqueous aluminum salt solution and dehydration of the resulting alumina hydrate, high-temperature burning of aluminum salt, hydrolysis of aluminum alkoxide, and hydrolysis of alkylaluminum. Any of the aluminum oxides produced by these processes can be used as a particulate metal oxide.

As antimony oxide, diantimony trioxide is preferred. In production thereof, there can be used, for example, a process wherein air is blown into molten antimonite or molten metallic antimony, and a process wherein antimonite is burnt and the evaporated diantimony trioxide is quenched to obtain diantimony trioxide in a fine powder state.

As the compound oxide, aluminum silicate can be used. It can be obtained by reacting an aqueous sodium silicate solution with an aqueous aluminum salt solution.

The above-mentioned metal oxides can be used singly or in combination of two or more.

The suspension of the particulate metal oxide(s) is generally translucent white even when the metal oxide(s) has (have) small particle diameters. However, the suspension has been found to become transparent when mixed with the above-mentioned particular (meth)acrylamide derivative(s), making it possible to produce a transparent aqueous gel. This is one of the unexpected effects of the present invention.

In the present invention, the aqueous medium is water. As the water, there can be used any of ion-exchanged water, distilled water, underground water, tap water and industrial water. As the aqueous medium, there can also be used a combination of water with a solvent miscible with water. The miscible solvent includes a lower alcohol, a glycol, a ketone, an amide, a saccharide and urea, and is useful for the prevention of freezing of the aqueous medium.

As the lower alcohol, there can be mentioned methyl alcohol, ethyl alcohol, propyl alcohol, etc. As the glycol, there can be mentioned ethylene glycol, propylene glycol, glycerine, diethylene glycol, dipropylene glycol, polyethylene glycol, polypropylene glycol, polyglycerine, copolymers thereof, etc. As the ketone, there can be mentioned acetone, methyl ethyl ketone, etc. As the amide, there can be mentioned formamide, N,N-dimethylformamide, N,N-dimethylacetamide, etc. As the saccharide, there can be mentioned monosaccharides such as glyceraldehyde, erythritol, xylose, ribose, arabitose, galactose, glucose, sorbose, mannose and the like; disaccharides such as saccharose, maltose, lactose and the like; and polysaccharides such as cyclodextrin, raffinose, agarose, glycogen, dextran and the like. The proportion of the miscible solvent in the aqueous medium is 70% by weight or less, preferably 60% by weight or less, more preferably 50% by weight or less.

In the aqueous gel, the proportion of the particular (meth)acrylamide derivative polymer is 1–40% by weight, preferably 2–35% by weight, more preferably 3–30% by weight. The proportion of the particulate metal oxide(s) is 1–45% by weight, preferably 4–40% by weight, more preferably 8–35% by weight. The proportion of the aqueous medium is the remainder.

In the aqueous gel used in fire-resistant plate-shaped composite material, the content of water (aqueous medium) has large influence on the fire resistance of said material. A high content of water makes the fire resistance low. The water content differs depending upon the ratio of the (meth)acrylamide derivative polymer and the particulate metal oxide(s), but is preferably about 60% by weight or less.

In order to stabilize the suspension of the particulate metal oxide(s), it is possible to use a surfactant. The surfactant can be any of an anionic type, a nonionic type, a cationic type and an amphoteric type. Of these, an anionic or nonionic type surfactant is particularly preferred.

Next, description is made on the process for producing an aqueous gel comprising a polymer of particular (meth)acrylamide derivative(s) and particulate metal oxide(s). The aqueous gel can be produced by polymerizing particular (meth)acrylamide derivative(s) in the presence of a suspension of particulate metal oxide(s), or by mixing an aqueous solution of said polymer with a suspension of particulate metal oxide(s). The former production is preferable because the suspension of the metal oxide(s) is uniform and the polymerization is easy.

The polymerization can be initiated, for example, by the application of high-energy rays, the use of a polymerization initiator, or the application of high-energy rays in the presence of a polymerization initiator.

As the high-energy rays, there can be used various rays such as ultraviolet light, visible light, electron rays, X-rays (γ rays) and the like. Of these, ultraviolet light or electron rays are preferable. Ultraviolet light is particularly preferable because it has no restriction for the apparatus used.

It is possible to initiate the polymerization only by the application of high-energy rays. However, when ultraviolet light is used, it is preferable to use a photopolymerization initiator in combination. The photopolymerization initiator has no particular restriction. Specific examples thereof are dimethylaminobenzoic acid and alkyl ester derivatives thereof (e.g. methyl dimethylaminobenzoate); acetophenone derivatives (e.g. 2,2-diethoxyacetophenone); ketal derivatives (e.g. benzenedimethylketal) and acetal derivatives; diazide derivatives (e.g. 4,4'-diazido-stilbene- 2,2'-disulfonic acid); pyrene derivatives (e.g. 3,3-dimethyl- 4-methoxy-benzophenoneacidpyrene); naphtoquinone (1,2) diazide (2) derivatives (e.g. sodium naphthoquinone (1,2) diazido (2)-4-sulfonate); triphenylpyridium perchlorate and derivatives thereof; benzophenone derivatives (e.g. 4,4'-bisdimethylaminobenzophenone); benzil; benzoin and alkyl ether derivatives thereof; 2-hydroxy-2-methyl-propiophenone and derivatives thereof (e.g. 2,4-diethylthioxanthone); azido-substituted derivatives (e.g. p-azidobenzoic acid); thioxanthone and derivatives thereof (e.g. 2,4-diethylthioxanthone); dibenzosuberone; and 5-nitroacenaphthene; 1-hydroxycyclohexylphenylketone. These photopolymerization initiators may be used singly or in combination of two or more. They may be used in combination with a photosensitizer, for example, an amine derivative such as aromatic amine, aliphatic amine, ethyl p-dimethylaminobenzoate, isoamyl p-dimethylaminobenzoate or the like. The addition of a photosensitizer can accelerate the curing rate.

The amount of the photopolymerization initiator used is generally 0.05–10% by weight, preferably 0.07–6% by weight, more preferably 0.1–4% by weight based on the particular (meth)acrylamide derivative(s). Tow or more photopolymerization initiators may be used.

The ultraviolet-light-generating lamp has no particular restriction and can be any as long as it can generate ultraviolet light. A mercury lamp can be used generally. An ultra-high-pressure mercury lamp or a high-pressure mercury lamp is preferable. A mercury lamp of standard type, ozoneless type, metal halide type or water cooling type can be used. The appropriate output of the lamp is 0.1–500 w/cm. The appropriate energy applied to the target material is 10–10,000 mJ/cm$^2$, preferably 50–5,000 mJ/cm$^2$. The application of the ultraviolet light to the target material can be conducted by fixing the target material or by transferring the material on a belt conveyor or the like.

The atmosphere in a reaction system when the polymerization is conducted, may be air or an atmosphere containing less oxygen than air, for example, an atmosphere purged with an inert gas such as nitrogen gas or the like.

Since the aqueous suspension of particulate metal oxide(s) containing particular (meth)acrylamide derivative(s) has fluidity, the application of ultraviolet light to the suspension is preferably conducted by wrapping the suspension in a film, a sheet or plates, all having transparency, or by interposing the suspension between said films, sheets or plates, or by shielding the suspension with said film, sheet or plates. The fluidity problem of said suspension can also be solved by increasing the viscosity of the suspension. Thus, aqueous gels having different shapes can be produced by appropriately designing the shape of the material for holding the suspension. For example, aqueous gels of film shape, plate shape, block shape, spherical shape, etc. can be produced. In this case, it is preferable to remove, in advance, the oxygen dissolved in the suspension because the removal enables rapid polymerization.

The removal of dissolved oxygen can be conducted by various methods such as vacuum degassing, blowing of inert gas and the like. Vacuum degassing is preferable in view of the suppression of foam generation in aqueous gel produced.

Since the polymerization is photopolymerization, it can be conducted at an atmospheric temperature and no heating is necessary. The polymerization temperature is about 0°–50° C. The polymerization time corresponds to the time in which ultraviolet light is applied, and differs depending upon the composition of monomers polymerized, the amount of polymerization initiator added, the intensity of ultraviolet light applied; hence, the polymerization time cannot be specified but is approximately 1 second to 30 minutes.

In initiating the polymerization by using a polymerization initiator, the polymerization initiator has no restriction as long as it can initiate radical polymerization. It includes inorganic peroxides, organic peroxides, combinations of these oxides and reducing agents, and azo compounds. Specific examples of the peroxides are ammonium persulfate, potassium persulfate, hydrogen peroxide, tert-butyl peroxide, benzoyl peroxide, cumene hydroperoxide, tert-butyl peroxy-2-ethylhexanoate and butyl perbenzoate. Specific examples of the reducing agents used in combination with the peroxides are sulfites; hydrogensulfites; salts of lower ionic values of iron, copper, cobalt, etc.; organic amines such as aniline and the like; and reducing sugars such as aldose, ketose and the like. Specific examples of the azo compounds are azobisisobutyronitrile, 2,2'-azobis-2-amidinopropane hydrochloride, 2,2'-azobis-2,4-dimethylvaleronitrile and 4,4'-azobis- 4-cyanovaleic acid. These polymerization initiators can be used singly or in combination of two or more. The amount of the polymerization initiator used is sufficiently the level used ordinarily, and is, for example, 0.01–5% by weight, preferably 0.05–2% by weight based on the monomers.

The atmosphere in a reaction system when the polymerization is conducted, may be air or an atmosphere containing less oxygen than air, for example, an atmosphere purged with an inert gas such as nitrogen gas or the like. In this case, it is preferable to remove, in advance, the oxygen dissolved in the suspension because the removal enables rapid polymerization.

The removal of dissolved oxygen can be conducted by various methods such as vacuum degassing, blowing of inert gas and the like. Vacuum degassing is preferable in view of the suppression of foam generation in aqueous gel produced.

In initiating the polymerization by applying high-energy rays in the presence of a polymerization initiator, the above two polymerization initiation methods are combined. That is, high-energy rays are applied in the presence of a polymerization initiator. When ultraviolet light or the like is used as the high-energy rays, the polymerization initiator used is preferably a photopolymerization initiator.

Since this polymerization initiation is conducted in a composite system, the method is troublesome in operation but is effective for the reduction of unreacted monomers remaining during polymerization.

A specific example of the polymerization is described. Particulate metal oxide(s) as mentioned above is (are) suspended in an aqueous medium; thereto is (are) added particular (meth)acrylamide derivative(s) to prepare a composition to be subjected to polymerization; to the composition is added, as necessary, a (photo)polymerization initiator; then, the resulting composition-is degassed under vacuum.

The vacuum is approximately several tens mmHg to several hundreds mmHg. After the degassing, the composition is returned to atmospheric pressure, and the gas used for the returning may be an oxygen-containing gas (e.g. air) or an inert gas (e.g. nitrogen gas). The addition of the polymerization initiator may be conducted after the degassing.

When the polymerization is initiated by applying high-energy rays, the application can be conducted by fixing the target material or by transferring the material on a belt conveyor or the like. In order to conduct the application efficiently, the target material preferably has a flat structure such as film, sheet, plate or the like.

Specifically, the suspension of a composition to be polymerized is fed at one end of a conveyor and is exposed to high-energy rays on the conveyor to give rise to polymerization and produce an aqueous gel, and the aqueous gel is recovered at the other end of the conveyor. Thus, the continuous production of an aqueous gel is possible.

When the polymerization is initiated in the presence of a polymerization initiator, the polymerization can be conducted by the above-mentioned belt conveyor method; or by feeding particulate metal oxide(s), particular (meth)acrylamide derivative(s), etc. into an ordinary reactor, as necessary conducting degassing, adding a polymerization initiator, and effecting polymerization to produce an aqueous gel. The thus produced aqueous gel contains particulate metal oxide(s) uniformly dispersed therein.

In the above polymerization, by controlling the pH of the suspension of a composition to be polymerized, there can be produced aqueous gels of different properties.

That is, by using particulate metal oxide(s) having relatively small particle diameters of, for example, 1 μm or less and controlling the pH of said suspension to 7–13, there can be produced a transparent aqueous gel. There can be produced a transparent aqueous gel having a transparency of 70% or more in terms of total light transmittance and, when severer conditions are selected, a transparent aqueous gel having a transparency of 80% or more.

Various methods can be employed for control of pH. When the suspension of particulate metal oxide(s) has a pH falling within the above range, no pH control is required and particular (meth)acrylamide derivative(s) can be added to the suspension, after which polymerization is conducted as described above. While the suspension of particulate metal oxide(s) is (are) generally translucent white and is not completely transparent, the present inventors found that the suspension becomes transparent when mixed with particular (meth)acrylamide derivative(s) and, when the resulting mixture is polymerized in the above pH range, a transparent aqueous gel can be produced. This is one big feature of the present invention.

When pH control is made from acidity to alkalinity, there is added an alkaline substance such as alkali metal hydroxide (e.g. sodium hydroxide), alkaline earth metal hydroxide (e.g. calcium hydroxide), ammonia, organic amine compound (e.g. trimethylamine) or the like.

Meanwhile, when the suspension of particulate metal oxide(s) is controlled to pH 1–8 and then polymerization is conducted, an aqueous gel of high elasticity can be produced. High elasticity cannot be specified generally but it refers to improved elasticity (e.g. improved tensile strength) as compared with that of an aqueous gel containing no particulate metal oxide. High elasticity, when the elasticity is expressed by tensile strength, is approximately 1–100 kg/cm$^2$ although it varies largely depending upon the water content in the suspension. Elasticity is improved about 1.1- to 100-fold in terms of tensile strength when particulate metal oxide(s) is (are) present.

When the suspension of particulate metal oxide(s) is in the above pH range, polymerization can be conducted without making any pH adjustment. In the above pH range, an acidic pH range is preferable and, for example, a pH range of 2 to less than 7 is more preferable.

When pH control is made to an acidic side, there can be used an acidic substance such as inorganic acid (e.g. sulfuric acid, hydrochloric acid, nitric acid, phosphoric acid), saturated aliphatic acid (e.g. formic acid, acetic acid, propionic acid, lactic acid, tartaric acid, oxalic acid, malonic acid), unsaturated fatty acid (e.g. acrylic acid, methacrylic acid, itaconic acid), sulfonic acid (e.g. methanesulfonic acid, benzenesulfonic acid, p-toluenesulfonic acid, vinylsulfonic acid, methallylsulfonic acid, 2-acrylamide- 2-methylpropanesulfonic acid, 2-acrylamide-2-phenylpropanesulfonic acid) or the like. The acidic substance may be neutralized partially and added as a mixture with the resulting salt.

An aqueous gel of high elasticity can also be produced by adding the above acidic substance to an aqueous gel obtained by polymerization. The addition is conducted so as to give the above pH range, preferably an acidic range, for example, a pH range of 2–6.

In drying the aqueous gel to produce a water-absorbable composition, a film-shaped water-absorbable composition can be produced by drying a film-shaped aqueous gel as it is; and a powdery water-absorbable composition can be produced by breaking an aqueous gel into small pieces, followed by drying and grinding. The drying can be conducted by hot air drying, infrared drying, etc. The grinding can be conducted by using a roll crusher, a hammer mill, a rotary crusher, a ball mill, a bantam mill, a rod mill, etc.

By interposing the aqueous gel between transparent plates, there can be produced a thermosensitive plate-shaped composite material or a fire-resistant plate-shaped composite material. As the transparent plates, there can be used any of organic plates and inorganic plates.

As the organic plates, there are mentioned those made of a polymethyl methacrylate, a polyallyl diglycol carbonate, a polystyrene, a styrene-acrylonitrile copolymer, a polycarbonate, a polypropylene, a polyethylene, an unsaturated polyester resin, a diallyl phthalate resin, a polyethyl itaconate-lead salt, a polymethyl acrylate, triacetylcellulose, acetylbutylcellulose, etc.

As the inorganic plates, there are mentioned those made of glass, light-transmitting ceramic (e.g. light-transmitting alumina), etc.

The sides of the plates which come in contact with the aqueous gel, may be subjected to a plasma treatment, a flame treatment, a sputtering treatment with a metal or a metal oxide (e.g. ITO), or the like in order to endow said sides with improved adhesion to the gel, improved protection from heat rays, and other properties.

Endowing said sides of the plates with improved adhesion to the gel can also be done by subjecting said sides to a treatment with a silane coupling agent. Inorganic plates, particularly glass plates are suitable for this treatment. As the silane coupling agent, there are mentioned vinyltrimethoxysilane, vinyltriethoxysilane, γ-(methacryloxypropyl)trimethoxysilane, γ-glycidoxypropyltrimethoxysilane, γ-glycidoxypropylmethyldiethoxysilane, N-β(aminoethyl)-γ-aminopropyltrimethoxysilane, γ-aminopropyltriethoxysilane, N-phenyl-γ-aminopropyltrimethoxysilane, γ-mercaptopropyltrimethoxysilane, γ-chloropropyltrimethoxysilane, etc.

The surface treatment with a silane coupling agent can be conducted by an ordinary method. That is, a solution of 0.1–5% by weight of a silane coupling agent dissolved in water, acetic acid, an alcohol or a mixed solvent thereof, is coated on plates, and the coated plates are dried at 80°–160° C. for 5–60 minutes.

The sealing of an aqueous gel in between the transparent plates can be made by interposing an aqueous gel between plates, or by sealing monomers to be polymerized, in between transparent plates and polymerizing the monomers therein. In order to seal an aqueous gel efficiently and precisely, the latter approach is preferred. In the latter approach, the polymerization can be conducted in the same manner as described previously. Specifically, the space between the plates is purged with an inert gas (e.g. nitrogen gas). The aqueous monomer solution to be sealed is preferably degassed beforehand. The sealing of the solution is preferably conducted under vacuum because it enables further degassing. The polymerization after sealing brings about shrinkage and there may occur separation between the plates and the gel; hence, in order to prevent it, the polymerization may be conducted under pressure.

Thus, a thermosensitive plate-shaped composite material or a fire-resistant plate-shaped composite material is produced. The plate thickness in the thermosensitive plate-shaped composite material is about 0.1–10 mm and that in the fire-resistant plate-shaped composite material is about 1–20 mm. The gel thickness in the former composite material is about 0.1–10 mm and that in the latter composite material is about 1–100 mm.

With respect to the properties of the aqueous gel produced as above, the aqueous gel produced by polymerization in an acidic to neutral range is translucent to translucent white, and the gel produced by polymerization in a suspension of a metal oxide of relatively small particle diameters in a neutral to alkaline range is colorless and transparent.

Further, the aqueous gel produced by polymerization in an acidic to neutral range has higher elasticity than the aqueous gel produced by polymerization in a neutral to alkaline range. Specifically, the former gel has a tensile strength of about 1–100 kg/cm$^2$ (this varies largely depending upon the water content in the gel) and its tensile elongation at breakage is 1.5–10 times the length under no load.

Thus, in the present invention it is possible to make strong an aqueous gel which is dynamically fragile inherently, by allowing the gel to contain particulate metal oxide(s). This is one big feature of the present invention.

Further, the aqueous gel of the present invention can absorb water when dipped in water. The aqueous gel produced in a neutral to alkaline range can absorb water in a wide pH range from acidity to alkalinity. Meanwhile, the aqueous gel produced in an acidic to neutral range has a very unique property by showing high water absorption in a strongly alkaline range while showing low water absorption in an acidic to weakly alkaline range.

The water-absorbable composition of the present invention which is obtained by drying the present aqueous gel (this aqueous gel may be one produced in an acidic range or one produced in an alkaline range), can show high swelling particularly in a strongly alkaline aqueous solution. Such a water-absorbing property is not observed in ordinary water-absorbing resins and is brought about by containing particulate metal oxide(s).

The aqueous gel and the water-absorbable composition obtained by drying said gel show about the same water absorption level per solid content, and their water absorptions are about 1–1,000 times the solid content. When the gel contains a thermosensitive polymer, the water absorption varies with the change in temperature and is higher at lower temperatures and lower at higher temperatures; that is, the gel is a thermosensitive gel.

The thermosensitive gel contains a water-insoluble polymer having a crosslinked structure. While an aqueous gel containing a polymer produced using no crosslinking agent is water-soluble, the thermosensitive gel gets cloudy (i.e. shows a cloud point) when heated. Hence, by interposing the thermosensitive gel between inorganic or organic transparent plates, there can be produced a thermosensitive plate-shaped composite material which gets whitish and opaque at a certain temperature or above and which gets transparent below said temperature. This thermosensitive plate-shaped composite material has various applications. In the conventional aqueous gel containing a thermosensitive polymer alone, when the gel is allowed to stand at a high temperature for a long time, it occurs in some cases that the polymer precipitates first (the gel gets cloudy) and then shows agglomeration (the gel loses the cloudiness and gets transparent). By adding particulate metal oxide(s), the agglomeration can be prevented and the resulting thermosensitive plate-shaped composite material can have improved durability.

By interposing the above gel between transparent plates, there can be produced a fire-resistant plate-shaped composite material capable of preventing the spreading of flames when exposed to flames at one side. The transparent plates are preferably inorganic plates in view of the fire resistance, and various flat glasses are generally used as such plates.

The fire-resistant plate-shaped composite material of the present invention can be used as a fire-resistant glass.

When the fire-resistant plate-shaped composite material of the present invention comes into contact with flames, the surface temperature of the gel increases; the gel gets whitish; water in the gel begin to separate from the gel, and the gel looks like being in a sweat. At this step, the plates (e.g. flat glass) contacting with the gel break. A polymer of particular (meth)acrylamide derivative(s) and particulate metal oxide(s) in the gel form a composite material and, as the vaporization of water proceeds, the gel becomes a white porous plate-shaped material. With further heating, the water vaporization from the gel surface is complete, and the gel becomes a dense porous layer and forms a fire-resistant layer of high heat insulation. With continued heating and further temperature increase, the polymer of particular (meth)acrylamide derivative(s) at the surface of the dense porous layer is burnt, decomposed and carbonized and finally disappears, whereby a porous structure consisting of metal oxide(s) is formed and very high fire resistance is obtained. That is, this porous structure prevents flames from penetrating inside and suppresses the transfer of heat. Hence, even a small gel thickness can exhibit high fire resistance.

As mentioned above, the fire-resistant plate-shaped composite material of the present invention is made to be transparent and, when in contact with flames, exhibits shielding from heat rays owing to whitening, high heat insulation and fire resistance owing to formation of porous material and non-flammability owing to the presence of particulate metal oxide(s). Therefore, it can find wide applications as a fire-resistant material uncomparable with conventional products.

The aqueous gel of the present invention is useful as a coating for fire-resistant, flame-resistant or heat-insulating purpose. That is, the aqueous gel is, as necessary, mixed with various additives such as film-smoothening agent, antifoaming agent, diluent and the like to prepare a coating; the coating is coated on a material which requires fire resistance. As such a material, there are mentioned wood, plastics, metals, etc. of various shapes such as plate, sheet, tape, fiber and the like.

In the above coating, the aqueous gel is diluted with a diluent so as to have appropriate fluidity, then coated, and dried. Alternatively, it is possible to (1) coat, on the above material, a suspension of particulate metal oxide(s) containing particular (meth)acrylamide derivative(s) to form a film and (2) apply heat or high-energy rays (e.g. ultraviolet light) to polymerize and cure the film.

The aqueous gel of the present invention comprising a polymer of particular (meth)acrylamide derivative(s) and particulate metal oxide(s) forms a composite structure by the interaction (hydrogen bond) between the hydroxyl group on the surfaces of the metal oxide particles and the amide group of the polymer of particular (meth)acrylamide derivative(s); has the following features unobtainable with said respective components; and is usable in various applications.

(1) The appearance can be controlled in a range from transparent to translucent white.

(2) The strength is significantly improved as compared with those of organic aqueous gels.

(3) The water absorption capability can be controlled by the pH employed at the time of gel production.

(4) Can be produced so as to get cloudy (show a cloud point) at a certain temperature.

(5) Has fire resistance by preventing the spreading of flames.

By utilizing the water absorbability or the swellability shown even under strong alkalinity, the present aqueous gel is usable as a water-absorbing material (resin, film, tape) for construction and civil engineering fields, particularly for cement and mortar. By further utilizing the high gel strength, the present gel is usable as a water-stopping agent and a fire-resistant material.

By utilizing the thermosensitivity of repeating expansion and shrinkage by temperature change, the present aqueous gel can be used as various sensors, for example, a water sensor of repeated use type.

The present aqueous gel, when used as a thermosensitive plate-shaped composite material, can be used as a light-shielding plate, a sun-shielding panel, a partition (in bathroom and shower room), etc.

The present aqueous gel, when used as a fire-resistant plate-shaped composite material, can be used as a fire-resistant glass, a fire-resistant panel, a fire-resistant partition, a fire-resistant tape, a fire-resistant film, etc.

The present aqueous gel can be used to applications other than the above, such as heat-insulating material (plate, wall, film, gel) and sound-insulating material (plate, wall, film, gel).

The present aqueous gel, being weakly alkaline, is safe even when it is made into a plate-shaped material and broken to cause fluid leakage. Further, having good adhesion to flat glass, the aqueous gel is superior in prevention of dropping of broken glass. When exposed to flames, the present aqueous gel can prevent the spreading of the flames and, moreover, gets whitish and thereby can shield itself from the heat rays emitted from the flames and prevent the fire spreading caused by heat radiation.

The present invention is hereinafter described specifically.

Production of Aqueous Gels and their Test Results

EXAMPLE 1

9.9 g of acrylamide and 0.1 g of methylenebisacrylamide were slowly added to 40.0 g of an alkaline aqueous collidal silica suspension (silica particle diameters=7–9 μm, $SiO_2$ content=30%) with stirring to obtain a solution. The solution had a pH of 10.3. In this aqueous solution was dissolved 0.3 g of 2-hydroxy-2-methyl-1-phenylpropan-1-one. The container inside was sufficiently purged with nitrogen. The solution was poured into a Teflon-made laboratory dish of 14.5 cm in diameter and irradiated with 400 mJ/cm$^2$ of ultraviolet light in a nitrogen atmosphere to conduct polymerization to obtain a sheet-shaped transparent aqueous gel of polyacrylamide. This aqueous gel had a water content of 52.7% and a total light transmittance of 84.4%. The aqueous gel was subjected to the following tests. The test results are shown in Tables 1 and 2.

(a) Tensile strength and elongation

From an aqueous gel sheet of 2–3 mm in thickness was punched a test piece of 24 mm in width and 100 mm in length (the width and length of measuring portion were 5 mm and 20 mm, respectively). The test piece was measured for tensile strength and elongation using a tensile tester [TENSILON UTM- 111-100 of TOYO BALDWIN CO., LTD.].

(b) Swelling degree

From an aqueous gel sheet of 2.5 mm in thickness were punched square test pieces of 25 mm×25 mm. The test pieces were dipped in distilled water, a physiological saline (NaCl=0.9%) solution, an aqueous NaOH (1 mole/l) solution (pH=13.8) and an aqueous $Na_2CO_3$ (1 mole/l) solution (pH 11.7) at 25° C. overnight, after which the weights of the expanded test pieces were measured. The test piece was dried at 110° C. and the swelling degrees of the gel in the above liquids were determined.

EXAMPLE 2

A transparent aqueous gel of poly(N,N-dimethylacrylamide) was obtained in the same manner as in Example 1 except that N,N-dimethylacrylamide was used in place of acrylamide. The aqueous gel had a water content of 53.8% and a total light transmittance of 82.4%. The gel was tested in the same manners as in Example 1. The test results are shown in Tables 1 and 2.

EXAMPLE 3

A transparent aqueous gel of poly(N-acryloylpyrrolidine) was obtained in the same manner as in Example 1 except that N-acryloylpyrrolidine was used in place of acrylamide. The aqueous gel had a water content of 58.7% and a total light transmittance of 84.9%. The gel was tested in the same manners as in Example 1. The test results are shown in Tables 1 and 2.

EXAMPLE 4

9.9 g of acrylamide and 0.1 g of methylenebisacrylamide were slowly added to 40.0 g of an alkaline aqueous collidal silica suspension (silica particle diameters=7–9 μm, $SiO_2$ content=30%) with stirring to obtain a solution. To the solution was dropwise added acetic acid to reduce the pH of the solution to 6.3. In the resulting aqueous solution was dissolved 0.3 g of 2-hydroxy-2-methyl-1-phenylpropan-1-one. The container inside was sufficiently purged with nitrogen. The solution was poured into a Teflon-made laboratory dish of 14.5 cm in diameter and irradiated with 400 mJ/cm$^2$ of ultraviolet light in a nitrogen atmosphere to conduct polymerization to obtain a sheet-shaped white aqueous gel of polyacrylamide. This aqueous gel had a water content of 55.3% and a total light transmittance of 0.7%. The aqueous gel was tested in the same manners as in Example 1. The test results are shown in Tables 1 and 2.

EXAMPLE 5

A white aqueous gel of poly(N,N-dimethylacrylamide) was obtained in the same manner as in Example 4 except that N,N-dimethylacrylamide was used in place of acrylamide. The aqueous gel had a water content of 54.7% and a total light transmittance of 0.6%. The gel was tested in the same manners as in Example 1. The test results are shown in Tables 1 and 2.

EXAMPLE 6

A white aqueous gel of poly(N-acryloylpyrrolidine) was obtained in the same manner as in Example 4 except that N-acryloylpyrrolidine was used in place of acrylamide. The aqueous gel had a water content of 54.8% and a total light transmittance of 0.2%. The gel was tested in the same manners as in Example 1. The test results are shown in Tables 1 and 2.

COMPARATIVE EXAMPLE 1

21.78 g of acrylamide and 0.22 g of methylenebisacrylamide were completely dissolved in 28.0 g of distilled water. In the resulting solution was dissolved 0.3 g of 2-hydroxy-2-methyl-1-phenylpropan-1-one. The container inside was sufficiently purged with nitrogen. The solution was poured into a Teflon-made laboratory dish of 14.5 cm in diameter and irradiated with 400 mJ/cm$^2$ of ultraviolet light in a nitrogen atmosphere to conduct polymerization to obtain a transparent aqueous gel sheet of polyacrylamide. This aqueous gel had a water content of 55.4% and a total light transmittance of 84.8%. The aqueous gel was tested in the same manners as in Example 1. The test results are shown in Tables 1 and 2.

COMPARATIVE EXAMPLE 2

A transparent aqueous gel of poly(N,N-dimethylacrylamide) was obtained in the same manner as in Comparative Example 1 except that N,N-dimethylacrylamide was used in place of acrylamide. The aqueous gel had a water content of 49.4% and a total light transmittance of 84.5%. The gel was tested in the same manners as in Example 1. The test results are shown in Tables 1 and 2.

COMPARATIVE EXAMPLE 3

A transparent aqueous gel of poly(N-acryloylpyrrolidine) was obtained in the same manner as in Comparative Example 1 except that N-acryloylpyrrolidine was used in place of acrylamide. The aqueous gel had a water content of 53.1% and a total light transmittance of 84.9%. The gel was tested in the same manners as in Example 1. The test results are shown in Tables 1 and 2.

TABLE 1

|  | Tensile strength (kg/cm$^2$) | Elongation (%) |
| --- | --- | --- |
| Example |  |  |
| 1 | 12.3 | 789.0 |
| 2 | 3.7 | 717.5 |
| 3 | 5.8 | 316.0 |
| 4 | 17.5 | 686.0 |
| 5 | 8.6 | 516.5 |
| 6 | 8.5 | 185.0 |
| Comparative Example |  |  |
| 1 | 3.2 | 300.0 |
| 2 | 1.6 | 188.0 |
| 3 | 0.6 | 40.0 |

TABLE 2

|  | Swelling degree (g/g) | | | |
| --- | --- | --- | --- | --- |
|  | Distilled water | NaCl | NaOH | Na$_2$CO$_3$ |
| Example |  |  |  |  |
| 1 | 19.5 | 5.6 | 16.6 | 8.1 |
| 2 | 7.5 | — | — | — |
| 3 | 3.8 | 3.2 | 3.3 | 2.2 |
| 4 | 5.6 | 4.6 | 17.0 | 9.3 |
| 5 | 5.6 | — | — | — |
| 6 | 3.3 | 2.9 | 3.0 | 1.9 |
| Comparative Example |  |  |  |  |
| 1 | 9.5 | 7.9 | 19.8 | 9.7 |
| 2 | 9.7 | — | — | — |
| 3 | 6.7 | 6.5 | 2.6 | 1.9 |

Thus, transparent aqueous gels could be synthesized by polymerizing a hardenable composition comprising a particular (meth)acrylamide derivative and a particulate metal oxide, in an alkaline pH range. These transparent aqueous gels had high elasticity as compared with aqueous gels obtained by polymerizing a particular (meth)acrylamide derivative alone.

The white aqueous gels obtained by polymerization in an acidic pH range had higher elasticities than the above transparent aqueous gels obtained by polymerization in an alkaline pH range. These white aqueous gels did not show noticeable swelling in a neutral to weakly alkaline pH range but showed distinct swelling in a strongly alkaline pH range.

Production of Powdery Gels and Their Test Results

EXAMPLE 7

In a Dewar flask was placed 80.0 g of an aqueous colloidal silica suspension (silica particle diameters=40–50 μm, $SiO_2$ content=30%). Thereto was added 36.7 g of distilled water. Then, 19.8 g of acrylamide and 0.2 g of methylenebisacrylamide were added slowly with stirring, to obtain a solution.

The solution had a pH of 10.3. To this solution was dropwise added acetic acid to adjust the pH of the solution to 6.2. The container inside was sufficiently purged with nitrogen, and the temperature of the solution was kept at 30° C. Thereto was added 10 ml of an aqueous solution containing 4% of 2,2'-azobis(2-amidinopropane) dihydrochloride (a polymerization initiator), and polymerization was conducted for 2 hours. The temperature of the system was increased to 72° C. by the polymerization. The resulting aqueous gel was cut with a meat chopper, then dried at 60° C. for 12 hours, ground with a grinder, and sieved to obtain a powdery gel of 20–100 mesh in particle size.

One g each of the powdery gel was placed in three graduated cylinders of the same capacity. Thereto was added distilled water, an aqueous NaOH (1 mole/l) solution (pH=13.8), or an aqueous $Na_2CO_3$ (1 mole/l) solution (pH=11.7), and the change of gel volume with time was measured. The results of the volume change are shown in Table 3.

TABLE 3

| Solvent | Gel volume (ml/g) | | | | | |
|---|---|---|---|---|---|---|
| | 0 hr | 3 hr | 6 hr | 12 hr | 24 hr | 72 hr |
| $H_2O$ | 1.4 | 4.3 | 4.3 | 4.3 | 4.3 | 4.4 |
| $Na_2CO_3$ | 1.2 | 4.4 | 5.5 | 7.4 | 7.4 | 7.6 |
| NaOH | 1.2 | 15.0 | 17.1 | 17.3 | 19.2 | 20.0 |

EXAMPLE 8

A powdery gel was obtained in the same manner as in Example 7 except that no acetic acid was added. The powdery gel was subjected to the same testing as in Example 7. The test results are shown in Table 4.

TABLE 4

| Solvent | Gel volume (ml/g) | | | | | |
|---|---|---|---|---|---|---|
| | 0 hr | 3 hr | 6 hr | 12 hr | 24 hr | 72 hr |
| $H_2O$ | 1.5 | 6.1 | 6.1 | 6.2 | 6.2 | 6.2 |
| $Na_2CO_3$ | 1.3 | 5.7 | 6.0 | 7.0 | 8.2 | 8.8 |
| NaOH | 1.5 | 18.2 | 22.3 | 23.0 | 23.8 | 24.9 |

EXAMPLE 9

A powdery gel was obtained in the same manner as in Example 7 except that there was used an aqueous colloidal silica suspension (silica particle diameters=10–20 µm, $SiO_2$ content=30%). The powdery gel was subjected to the same testing as in Example 7. The test results are shown in Table 5.

TABLE 5

| Solvent | Gel volume (ml/g) | | | | | |
|---|---|---|---|---|---|---|
| | 0 hr | 3 hr | 6 hr | 12 hr | 24 hr | 72 hr |
| $H_2O$ | 1.5 | 4.4 | 4.4 | 4.4 | 4.5 | 4.5 |
| $Na_2CO_3$ | 1.4 | 4.5 | 5.7 | 7.6 | 7.6 | 7.8 |
| NaOH | 1.4 | 15.1 | 17.3 | 17.6 | 19.5 | 20.8 |

EXAMPLE 10

In a Dewar flask was placed 24.0 g of colloidal silica (average diameter of primary particles=0.02 µm, average diameters of secondary particles=8 µm). Thereto was added 92.7 g of distilled water to disperse the silica therein. Then, 19.8 g of acrylamide and 0.2 g of methylenebisacrylamide were added slowly with stirring, to obtain a solution. The solution had a pH of 6.2. The container inside was sufficiently purged with nitrogen, and the temperature of the solution was kept at 30° C. Thereto was added 10 ml of an aqueous solution containing 4% of 2,2'-azobis(2-amidinopropane) dihydrochloride (a polymerization initiator), and polymerization was conducted for 2 hours. The temperature of the system was increased to 72° C. by the polymerization. The resulting aqueous gel was cut with a meat chopper, then dried at 60° C. for 12 hours, ground with a grinder, and sieved to obtain a powdery gel of 20–100 mesh in particle size. The powdery gel was subjected to the same testing as in Example 7. The test results are shown in Table 6.

TABLE 6

| Solvent | Gel volume (ml/g) | | | | | |
|---|---|---|---|---|---|---|
| | 0 hr | 3 hr | 6 hr | 12 hr | 24 hr | 72 hr |
| $H_2O$ | 1.5 | 4.3 | 4.3 | 4.3 | 4.4 | 4.4 |
| $Na_2CO_3$ | 1.3 | 4.6 | 5.7 | 7.6 | 7.7 | 7.7 |
| NaOH | 1.2 | 15.6 | 17.6 | 18.0 | 19.6 | 20.7 |

COMPARATIVE EXAMPLE 4

43.56 g of acrylamide and 0.44 g of methylenebisacrylamide were added to 92.7 g of distilled water to obtain a solution. The container inside was sufficiently purged with nitrogen, and the temperature of the solution was kept at 30° C. Thereto was added 10 ml of an aqueous solution containing 4% of 2,2'-azobis(2-amidinopropane) dihydrochloride (a polymerization initiator), and polymerization was conducted for 2 hours. The temperature of the system was increased to 85° C. by the polymerization. The resulting aqueous gel was cut with a meat chopper, then dried at 60° C. for 12 hours, ground with a grinder, and sieved to obtain a powdery gel of 20–100 mesh in particle size. The powdery gel was subjected to the same testing as in Example 7. The test results are shown in Table 7.

TABLE 7

| Solvent | Gel volume (ml/g) | | | | | |
|---|---|---|---|---|---|---|
| | 0 hr | 3 hr | 6 hr | 12 hr | 24 hr | 72 hr |
| $H_2O$ | 1.5 | 13.5 | 13.5 | 13.7 | 13.7 | 13.7 |
| $Na_2CO_3$ | 1.4 | 11.0 | 11.0 | 11.5 | 12.1 | 13.8 |
| NaOH | 1.6 | 19.2 | 23.5 | 24.5 | 25.7 | 26.4 |

Production of Fire-resistant Glasses and Their Testing

EXAMPLE 11

29.7 g of N-acryloylpyrrolidine and 0.3 g of methylenebisacrylamide were slowly added to 70.0 g of an alkaline aqueous colloidal silica suspension (silica particle diameters=7–9 µm, $SiO_2$ content=30%) with stirring, to obtain a solution. The solution had a pH of 10.3. In the solution was dissolved 0.9 g of 2-hydroxy-2-methyl-1-phenylpropan-1-one. The resulting solution was degassed under vacuum and then poured in between two glass plates each of 150 mm×100 mm×2 mm (thickness) which were kept parallel to each other at a distance of 5 mm with a spacer member attached to the peripheries of the plates using an epoxy adhesive. Then, the glass plates were stoppered. The sealed glass plates containing the above solution were irradiated with 4,000 mJ/cm$^2$ of ultraviolet light in air to conduct polymerization to prepare a transparent fire-resistant glass. The fire-resistant glass was evaluated for fire resistance according to the following test method.

Fire Resistance Test

A Bunsen burner was set at a place 8 cm apart from a fire-resistant glass, and a flame of the burner was applied to the fire-resistant glass for 20 minutes. The conditions of glass surfaces and gel were observed.

In about 3 minutes from the start of flame application, the gel got cloudy. In about 5 minutes from the start of flame application, the glass plate to which the flame was applied, broke, and steam came out of the surface of the broken glass plate. With the completion of the steam generation, the gel became whitish and porous. Thereafter, the gel portion to which the flame was applied, scorched in a black color and there was seen the gradual formation of a white vitreous structure at the surface. The glass plate at the back side did not break and there was neither spreading of flame nor fuming at the back side. The gel after the test was white and solid like mortar at the portion to which no flame was applied, had slight cracks at the surface and showed contraction overall.

EXAMPLE 12

19.8 g of N-acryloylpyridine and 0.2 g of methylenebisacrylamide were slowly added to 80.0 g of an alkaline aqueous colloidal silica suspension (silica particle diameters =7–9 μm, SiO$_2$ content=30%) with stirring, to obtain a solution. The solution had a pH of 10.3. In the solution was dissolved 0.6 g of 2-hydroxy-2-methyl-1-phenylpropan-1-one. The resulting solution was degassed under vacuum. The subsequent procedure was the same as in Example 11 to prepare a transparent fire-resistant glass. The fire-resistant glass was subjected to the same fire resistance test as in Example 11.

The results of the fire resistance test were substantially the same as in Example 11. However, the gel showed larger contraction overall than in Example 11.

EXAMPLE 13

9.9 g of N-acryloylpyridine and 0.1 g of methylenebisacrylamide were slowly added to 90.0 g of an alkaline aqueous colloidal silica suspension (silica particle diameters =7–9 μm, SiO$_2$ content=30%) with stirring, to obtain a solution. The solution had a pH of 10.3. In the solution was dissolved 0.3 g of 2-hydroxy-2-methyl-1-phenylpropan-1-one.. The resulting solution was degassed under vacuum. The subsequent procedure was the same as in Example 11 to prepare a transparent fire-resistant glass. The fire-resistant glass was subjected to the same fire resistance test as in Example 11.

The results of the fire resistance test were substantially the same as in Examples 11 and 12. However, the gel showed slight contraction which was smaller than in Example 12.

EXAMPLE 14

9.9 g of N-acryloylpyridine, 9.9 g of acrylamide and 0.2 g of methylenebisacrylamide were slowly added to 80.0 g of an alkaline aqueous colloidal silica suspension (silica particle diameters=7–9 μm, SiO$_2$ content=30%) with stirring, to obtain a solution. The solution had a pH of 10.3. In the solution was dissolved 0.6 g of 2-hydroxy-2-methyl-1-phenylpropan-1-one. The resulting solution was degassed under vacuum. The subsequent procedure was the same as in Example 11 to prepare a transparent fire-resistant glass. The fire-resistant glass was subjected to the same fire resistance test as in Example 11.

In about 5 minutes from the start of flame application, the glass plate to which the flame was applied, broke, and steam came out of the surface of the broken glass plate. With the completion of the steam generation, the gel became whitish and porous. Then, part of the gel burnt like sparkling but the remainder (the most part) of the gel did not burn. The gel portion to which the flame was applied, scorched in a black color, and part of the gel surface showed slight collapse. The glass plate at the back side did not break and there was neither spreading of flame nor fuming at the back side. The gel after the test was white and solid like mortar at the portion to which no flame was applied, had slight cracks at the surface and showed slight contraction overall.

EXAMPLE 15

A transparent fire-resistant glass containing an aqueous gel of polyacrylamide was obtained in the same manner as in Example 12 except that acrylamide was used in place of N-acryloylpyridine. The fire-resistant glass was subjected to the same fire resistance test as in Example 11.

The results of the fire resistance test were substantially the same as in Example 14.

EXAMPLE 16

9.9 g of N-acryloylpyridine, 9.9 g of N,N-dimethylacrylamide and 0.2 g of methylenebisacrylamide were slowly added to 80.0 g of an alkaline aqueous colloidal silica suspension (silica particle diameters=7–9 μm, SiO$_2$ content= 30%) with stirring, to obtain a solution. The solution had a pH of 10.3. In the solution was dissolved 0.6 g of 2-hydroxy-2-methyl-1-phenylpropan-1-one. The resulting solution was degassed under vacuum. The subsequent procedure was the same as in Example 11 to prepare a transparent fire-resistant glass. The fire-resistant glass was subjected to the same fire resistance test as in Example 11.

In about 5 minutes from the start of flame application, the glass plate to which the flame was applied, broke, and steam came out of the surface of the broken glass plate. With the completion of the steam generation, the gel became whitish and porous. Then, the gel portion to which the flame was applied, scorched in a black color. The glass plate at the back side did not break and there was neither spreading of flame nor fuming at the back side. The gel after the test was white and solid like mortar at the portion to which no flame was applied, had slight cracks at the surface and showed slight contraction overall.

EXAMPLE 17

A transparent fire-resistant glass containing an aqueous gel of poly(N,N-dimethylacrylamide) was obtained in the same manner as in Example 14 except that N,N-dimethylacrylamide was used in place of N-acryloylpyridine. The fire-resistant glass was subjected to the same fire resistance test as in Example 11.

The results of the fire-resistance test were substantially the same as in Example 16.

EXAMPLE 18

19.8 g of N-acryloylpyrrolidine and 0.2 g of methylenebisacrylamide were slowly added to 80.0 g of an alkaline aqueous colloidal silica suspension (silica particle diameters=7–9 µm, $SiO_2$ content=30%) with stirring, to obtain a solution. The solution had a pH of 10.3. In the solution was dissolved 4 g of an aqueous solution containing 10% of potassium persulfate. The resulting solution was degassed under vacuum. In the solution was dissolved 2.5 g of an aqueous solution containing 2% of sodium hydrogensulfite. The resulting solution was poured in between two glass plates each of 150 mm×100 mm×2 mm (thickness) which were kept parallel to each other at a distance of 5 mm with a spacer member attached to the peripheries of the plates using an epoxy adhesive. Then, the glass plates were stoppered. The sealed glass plates containing the above solution were subjected to polymerization at room temperature for 3 hours to prepare a transparent fire-resistant glass. The fire-resistant glass was subjected to the same fire resistance test as in Example 11.

The results of the fire resistance test were substantially the same as in Example 11.

EXAMPLE 19

19.8 g of N-acryloylpyrrolidine and 0.2 g of methylenebisacrylamide were slowly added to 80.0 g of an alkaline aqueous colloidal silica suspension (silica particle diameters=7–9 µm, $SiO_2$ content=30%) with stirring, to obtain a solution. The solution had a pH of 10.3. In the solution were dissolved 0.1 g of 2-hydroxy-2-methyl-1-phenylpropan-1-one and 4 g of an aqueous solution containing 10% of potassium persulfate. The resulting solution was degassed under vacuum. In the solution was dissolved 2.5 g of an aqueous solution containing 2% of sodium hydrogensulfite. The subsequent procedure was the same as in Example 11 to prepare a transparent fire-resistant glass. The fire-resistant glass was subjected to the same fire resistance test as in Example 11.

The results of the fire resistance test were substantially the same as in Example 11.

EXAMPLE 20

25.0 g of ethylene glycol was dissolved in 65.0 g of an alkaline aqueous colloidal silica suspension (silica particle diameters=7–9 µm, $SiO_2$ content=30%). To the resulting solution were slowly added 9.9 g of N-acryloylpyrrolidine and 0.1 g of methylenebisacrylamide with stirring, to obtain a solution. The solution had a pH of 10.3. In the solution was dissolved 0.3 g of 2-hydroxy-2-methyl-1-phenylpropan-1-one. The resulting solution was degassed under vacuum. The subsequent procedure was the same as in Example 11 to prepare a transparent fire-resistant glass. The fire-resistant glass was kept at −20° C. for 2 hours, but remained transparent during the period without freezing. The glass was also subjected to the same fire resistance test as in Example 11.

The results of the fire resistance test were substantially the same as in Example 11.

EXAMPLE 21

25.0 g of saccharose was dissolved in 65.0 g of an alkaline aqueous colloidal silica suspension (silica particle diameters=7–9 µm, $SiO_2$ content=30%). To the resulting solution were slowly added 9.9 g of N-acryloylpyrrolidine and 0.1 g of methylenebisacrylamide with stirring, to obtain a solution. The solution had a pH of 10.3. In the solution was dissolved 0.3 g of 2-hydroxy-2-methyl-1-phenylpropan-1-one. The resulting solution was degassed under vacuum. The subsequent procedure was the same as in Example 11 to prepare a transparent fire-resistant glass. The fire-resistant glass was kept at −15° C. for 2 hours, but remained transparent during the period without freezing. The glass was also subjected to the same fire resistance test as in Example 11.

In about 3 minutes from the start of flame application, the gel got cloudy. In about 5 minutes from the start of flame application, the glass plate to which the flame was applied, broke, and steam came out of the surface of the broken glass plate. With the completion of the steam generation, the gel became whitish and porous. Thereafter, the whole gel scorched in a black color and there was seen the gradual formation of a white vitreous structure at the surface. The glass plate at the back side did not break and there was neither spreading of flame nor fuming at the back side. The gel after the test was white and solid like mortar at the portion to which no flame was applied, had slight cracks at the surface and showed contraction overall.

EXAMPLE 22

9.0 g of ethylene glycol, 8.0 g of saccharose and 8.0 g of urea were dissolved in 65.0 g of an alkaline aqueous colloidal silica suspension (silica particle diameters=7–9 µm, $SiO_2$ content=30%). To the resulting solution were slowly added 9.9 g of N-acryloylpyrrolidine and 0.1 g of methylenebisacrylamide with stirring, to obtain a solution. The solution had a pH of 10.3. In the solution was dissolved 0.3 g of 2-hydroxy-2-methyl-1-phenylpropan-1-one. The resulting solution was degassed under vacuum. The subsequent procedure was the same as in Example 11 to prepare a transparent fire-resistant glass. The fire-resistant glass was kept at −20° C. for 2 hours, but remained transparent during the period without freezing. The glass was also subjected to the same fire resistance test as in Example 11.

The results of the fire resistance test were substantially the same as in Example 11.

EXAMPLE 23

25.0 g of ethylene glycol was dissolved in 65.0 g of an alkaline aqueous colloidal silica suspension (silica particle diameters=7–9 µm, $SiO_2$ content=30%). To the resulting solution were slowly added 9.9 g of N-acryloylpyrrolidine and 0.1 g of methylenebisacrylamide with stirring, to obtain a solution. Thereto was added 1 ml of an aqueous solution containing 1% of amonium lauryl sulfate. The resulting solution had a pH of 10.3. In the solution was dissolved 0.3 g of 2-hydroxy-2-methyl-1-phenylpropan-1-one. The resulting solution was degassed under vacuum. The subsequent procedure was the same as in Example 11 to prepare a transparent fire-resistant glass. The fire-resistant glass was subjected to the same fire resistance test as in Example 11.

In about 3 minutes from the start of flame application, the gel got cloudy. In about 5 minutes from the start of flame application, the glass plate to which the flame was applied, broke, and steam came out of the surface of the broken glass plate. With the steam generation, foaming became violent. With the completion of steam generation, the foaming was over and the gel became whitish and porous. Thereafter, the gel portion to which the flame was applied, scorched in a black color and there was seen the gradual formation of a white vitreous structure at the surface. The glass plate at the back side did not break and there was neither spreading of flame nor fuming at the back side. The gel after the test was white and solid like mortar at the portion to which no flame was applied, had slight cracks at the surface and showed slight contraction overall.

EXAMPLE 24

A fire-resistant glass was prepared in the same manner as in Example 12 except that there were used glass plates of the same dimensions as in Example 12 which had been subjected to a silane coupling treatment by coating a methanol solution containing 1% of γ-(methacryloxypropyl)trimethoxysilane, on each one side of the glass plates before said treatment and drying the coated plates at 110° C. for 10 minutes. The fire-resistant glass was subjected to the same fire resistance test as in Example 11.

In about 3 minutes from the start of flame application, the gel got cloudy. In about 7-minutes from the start of flame application, the glass plate to which the flame was applied, broke, and steam came out of the surface of the broken glass plate. With the completion of the steam generation, the gel became whitish and porous. Thereafter, the gel portion to which the flame was applied, scorched in a black color and there was seen the gradual formation of a white vitreous structure at the surface. The glass plate at the back side did not break and there was neither spreading of flame nor fuming at the back side. The gel after the test was white and solid like mortar at the portion to which no flame was applied and had slight cracks at the surface, but the gel adhered to the entire surface of the glass plate of the back side and showed no contraction.

EXAMPLE 25

19.8 g of N-acryloylpyrrolidine and 0.2 g of methylenebisacrylamide were slowly added to 80.0 g of an acidic aqueous alumina sol suspension (alumina sol particle diameters=10–20 μm, $Al_2O_3$ content=20%) with stirring, to obtain a solution. Thereto was dropwise added ammonia water to increase the pH of the solution to 9.3. In the solution was dissolved 0.6 g of 2-hydroxy-2-methyl-1-phenylpropan-1-one. The resulting solution was degassed under vacuum. The subsequent procedure was the same as in Example 11 to prepare a transparent fire-resistant glass. The fire-resistant glass was subjected to the same fire resistance test as in Example 11.

The results of the fire resistance test was substantially the same as in Example 11.

EXAMPLE 26

A slightly transluent white fire-resistant glass was obtained in the same manner as in Example 13 except that N,N-diethylacrylamide was used in place of N-acryloylpyrrolidine. The fire-resistant glass was subjected to the same fire resistance test as in Example 11.

In about 5 minutes from the start of flame application, the glass plate to which the flame was applied, broke, and steam came out of the surface of the broken glass plate. With the completion of the steam generation, the gel became whitish and porous. Thereafter, the gel portion to which the flame was applied, scorched in a black color. The glass plate at the back side did not break and there was neither spreading of flame nor fuming at the back side. The gel after the test was white and solid like mortar at the portion to which no flame was applied, had slight cracks at the surface, and showed slight contraction overall.

EXAMPLE 27

3.0 g of ethylene glycol, 9.0 g of saccharose and 3.0 g of urea were dissolved in 75.0 g of an aqueous colloidal silica suspension (silica particle diameters=7–9 μm, $SiO_2$ content= 30%). To the resulting solution were slowly added 4.95 g of N,N-diethylacrylamide, 4.95 g of N,N-dimethylacrylamide and 0.1 g of methylenebisacrylamide with stirring, to obtain a solution. The solution had a pH of 10.3. In the solution was dissolved 0.03 g of 2-hydroxy-2-methyl-1-phenylpropan-1-one. The resulting solution was degassed under vacuum and then poured in between two glass plates (they had been subjected to the same silane coupling treatment as in Example 24) each of 150 mm×100 mm×2 mm (thickness) which were kept parallel to each other at a distance of 5 mm with a spacer member attached to the peripheries of the plates using an epoxy adhesive. Then, the glass plates were stoppered. The sealed glass plates containing the above solution were irradiated with 4,000 $mJ/cm^2$ of ultraviolet light in air to conduct polymerization to prepare a transparent fire-resistant glass. The fire-resistant glass was kept at −15° C. for 2 hours but remained transparent without freezing. The fire-resistant glass was further subjected to the same fire resistance test as in Example 11.

In about 3 minutes from the start of flame application, the gel got cloudy. In about 7 minutes from the start of flame application, the glass plate to which the flame was applied, broke, and steam came out of the surface of the broken glass plate. With the completion of the steam generation, the gel became whitish and porous. Thereafter, the gel portion to which the flame was applied, scorched in a black color and there was seen the gradual formation of a white vitreous structure at the surface. The glass plate at the back side did not break and there was neither spreading of flame nor fuming at the back side. The gel after the test was white and solid like mortar at the portion to which no flame was applied and had slight cracks at the surface, but the gel adhered to the entire surface of the glass plate of the back side and showed no contraction.

EXAMPLE 28

A transparent fire-resistant glass was obtained in the same manner as in Example 27 except that there were used, as the monomers, 7.4 g of N-acryloylpyrrolidine and 2.5 g of N,N-dimethylacrylamide. The fire-resistant glass was kept at −20° C. for 2 hours but remained transparent without freezing. The fire-resistant glass was further subjected to the same fire resistance test as in Example 11.

The results of the fire resistance test were substantially the same as in Example 27.

COMPARATIVE EXAMPLE 5

19.8 g of N-acryloylpyrrolidine and 0.2 g of methylenebisacrylamide were slowly added to 80.0 g of distilled water with stirring, to obtain a solution. In the solution was dissolved 0.6 g of 2-hydroxy-2-methyl-1-phenylpropan-1-one. The resulting solution was degassed under vacuum. The subsequent procedure was the same as in Example 11 to prepare a transparent fire-resistant glass. The fire-resistant glass was subjected to the same fire resistance test as in Example 11.

In several seconds from the start of flame application, the gel got cloudy. In several tens of seconds from the start of flame application, the glass plate to which the flame was applied, broke, and steam came out of the surface of the broken glass plate. With the completion of the steam generation, the gel became whitish. Thereafter, the gel portion to which the flame was applied, scorched in a black color, burnt and collapsed. As a result, the glass plate at the back side broke, steam came out of the broken glass plate at the back side, and the flame spread through the fire-resistant glass.

Production of Thermosensitive Plate-shaped Materials and Their Testing

EXAMPLE 29

19.8 g of N-acryloylpyrrolidine and 0.2 g of methylenebisacrylamide were slowly added to 80.0 g of an aqueous colloidal silica suspension (silica particle diameters =7–9 µm, $SiO_2$ content=30%) with stirring, to obtain a solution. In the solution was dissolved 0.6 g of 2-hydroxy-2-methyl-1-phenylpropan-1-one. The resulting solution was degassed under vacuum and then poured in between two polycarbonate plates each of 150 mm×100 mm×2 mm (thickness) which were kept parallel to each other at a distance of 5 mm with a spacer member attached to the peripheries of the plates using an epoxy adhesive. Then, the polycarbonate plates were stoppered. The sealed polycarbonate plates containing the above solution were irradiated with 4,000 $mJ/cm^2$ of ultraviolet light in air to conduct polymerization to obtain a thermosensitive plate-shaped aqueous gel. The plate-shaped aqueous gel was dipped in water and subjected to gradual temperature elevation by heating, to measure a temperature at which the plate-shaped aqueous gel became completely cloudy, i.e. a cloud point. The result is shown in Table 8.

EXAMPLE 30

A thermosensitive plate-shaped aqueous gel was obtained in the same manner as in Example 29 except that 80.0 g of N-acryloylpiperidine was used in place of N-acryloylpyrrolidine. The aqueous gel was subjected to the same testing as in Example 29. The result is shown in Table 8.

EXAMPLE 31

A thermosensitive plate-shaped aqueous gel was obtained in the same manner as in Example 29 except that 40.0 g of N-acryloylpiperidine and 40.0 g of N,N-dimethylacrylamide were used in place of N-acryloylpyrrolidine. The aqueous gel was subjected to the same testing as in Example 29. The result is shown in Table 8.

EXAMPLE 32

A thermosensitive plate-shaped aqueous gel was obtained in the same manner as in Example 29 except that 40.0 g of N-acryloylpyrrolidine and 40.0 g of N-acryloylpiperidine were used in place of 19.8 g of N-acryloylpyrrolidine. The aqueous gel was subjected to the same testing as in Example 29. The result is shown in Table 8.

EXAMPLE 33

A thermosensitive plate-shaped aqueous gel was obtained in the same manner as in Example 29 except that 20.0 g of N-acryloylpyrrolidine and 60.0 g of N-acryloylpiperidine were used in place of 19.8 g of N-acryloylpyrrolidine. The aqueous gel was subjected to the same testing as in Example 29. The result is shown in Table 8.

EXAMPLE 34

A temperature-sensitive plate-shaped aqueous gel was obtained in the same manner as in Example 29 except that 40 g of N,N-diethylacrylamide and 40 g of N,N-dimethylacrylamide were used in place of 19.8 g of N-acryloylpyrrolidine. The aqueous gel was subjected to the same testing as in Example 29. The result is shown in Table 8.

TABLE 8

|  | Cloud point (°C.) |
| --- | --- |
| Example 29 | 51 |
| Example 30 | 5 |
| Example 31 | 58 |
| Example 32 | 24 |
| Example 33 | 20 |
| Example 34 | 53 |

Thus, by combining a thermosensitive monomer and a water-soluble monomer, there could be obtained thermosensitive plate-shaped aqueous gels having different cloud points. Incidentally, each of the above cloud points showed no change in ten repeated measurements.

EXAMPLE 35

2.5 g of glycerine was dissolved in 37.5 g of an aqueous colloidal silica suspension (silica particle diameters=7–9 µm, $SiO_2$ content=30%). Thereto were slowly added 9.9 g of acrylamide and 0.1 g of methylenebisacrylamide with stirring, to obtain a solution. In the solution was dissolved 0.3 g of 2-hydroxy-2-methyl-1-phenylpropane-1-one. The container inside was sufficiently purged with nitrogen. The contents in the container were poured into a Teflon-made laboratory dish of 14.5 cm in diameter and irradiated with 4,000 $mJ/cm^2$ of ultraviolet light in a nitrogen atmosphere to conduct polymerization. The resulting polymer was dried at 40° C. to obtain a transparent aqueous gel sheet of polyacrylamide, having flexibility.

EXAMPLE 36

2.5 g of glycerine was dissolved in 37.5 g of an aqueous colloidal silica suspension (silica particle diameters=10–20 µm, $SiO_2$ content=30%). Thereto were slowly added 9.9 g of acrylamide and 0.1 g of methylenebisacrylamide with stirring, to obtain a solution. In the solution was dissolved 0.3 g of 2-hydroxy-2-methyl-1-phenylpropane- 1-one. The container inside was sufficiently purged with nitrogen. The contents in the container were poured into a Teflon-made laboratory dish of 14.5 cm in diameter and irradiated with 4,000 $mJ/cm^2$ of ultraviolet light in a nitrogen atmosphere to conduct polymerization. The resulting polymer was dried at 40° C. to obtain a transparent aqueous gel sheet of polyacrylamide, having flexibility.

EXAMPLE 37

A transparent aqueous gel sheet of poly(N-acryloylpyrrolidine), having flexibility was obtained in the same manner as in Example 35 except that N-acryloylpyrrolidine was used in place of acrylamide.

EXAMPLE 38

10 g of N-acryloylpyrrolidine was added to 40 g of an aqueous colloidal silica suspension (silica particle diameters =10–20 µm, $SiO_2$ content=30%). Thereinto was blown nitrogen gas to remove the oxygen dissolved therein. Thereto was added 5 ml of an aqueous solution containing 4% of 2,2'-azobis(2-amidinopropane) dihydrochloride. Then, polymerization was started at 30° C. and continued for 2 hours. 40 ml of isopropyl alcohol was added for dilution. The diluted solution was coated on a polycarbonate plate of 2 mm in thickness and dried at 80° C. for 30 minutes to obtain a transparent uniform film.

We claim:

1. A gel forming composition consisting essential of (1) water soluble (meth)acrylamide or (meth)acrylamide derivative(s) each represented by the following general formula (I) or (II)

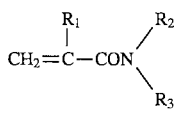
(I)

wherein $R_1$ represents a hydrogen atom or a methyl group, and $R_2$ represents a hydrogen atom, a methyl group or an ethyl group, and $R_3$ represents a hydrogen atom, a methyl group, an ethyl group or a propyl group,

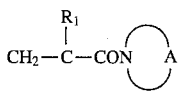
(II)

wherein $R_1$ represents a hydrogen atom or a methyl group, and A represents $-(CH_2)_n-$ (n is 4 to 6) or $-(CH_2)_2-O-(CH_2)_2-$, (2) water insoluble particulate metal oxide(s) and (3) an aqueous medium wherein the proportions of the (meth)acrylamide or (meth)acrylamide derivative(s), the particulate metal oxide(s) and the aqueous medium are 1–40% by weight, 1–45% by weight and 98–15% by weight, respectively, and wherein the particle diameters of the particulate metal oxide(s) are in the range of 0.01–20 μm, said (meth)acrylamide or (meth)acrylamide derivative(s) (I) or (II) dissolving in said aqueous medium to form a solution, said water insoluble particulate metal oxide(s) being dispersed in said aqueous medium solution, wherein polymerization of said aqueous medium solution provides an aqueous gel containing said particulate metal oxide dispersed therein.

2. A gel forming composition according to claim 1, wherein the proportions of the (meth)acrylamide or (meth)acrylamide derivative(s), the particulate metal oxide(s) and the aqueous medium are 2–35% by weight, 4–40% by weight and 94–25% by weight, respectively.

3. A gel forming composition according to claim 2, wherein the proportions of the (meth)acrylamide or (meth)acrylamide derivative(s), the particulate metal oxide(s) and the aqueous medium are 3–30% by weight, 8–35% by weight and 89–35% by weight, respectively.

4. A gel forming composition according to claim 1, wherein the particle diameters of the particulate metal oxide(s) are in the range of 0.001–10 μm.

5. A gel forming composition according to claim 1, wherein the particle diameters of the particulate metal oxide(s) are in the range of 0.001–5 μm.

6. A gel forming composition according to claim 1, wherein the particulate metal oxide(s) are water-insoluble.

7. A gel forming composition according to claim 6, wherein said particulate metal oxide(s) are selected from the group consisting of silicon dioxide, aluminum oxide, antimony oxide, titanium oxide, indium oxide, tin oxide, zirconium oxide, lead oxide, iron oxide, calcium oxide and magnesium oxide.

8. A gel forming composition according to claim 1, further comprising a polymerization initiator.

9. A gel-forming composition consisting of:
(1) 1–40% by weight (meth)acrylamide or (meth)acrylamide derivative(s) each represented by the following formula (I)

(I)

wherein $R_1$ is a hydrogen atom or a methyl group, $R_2$ is a hydrogen atom, a methyl group or an ethyl group, and $R_3$ is a hydrogen atom, a methyl group, an ethyl group or a propyl group, or formula (II)

(II)

wherein $R_1$ is a hydrogen atom or a methyl group, and A is $-(CH_2)_n-$ where n is 4–6, or A is $-(CH_2)_2-O-(CH_2)_2-$, (2) 1–45% by weight water-insoluble particulate metal oxide(s), wherein the particle diameters of said water-insoluble particulate metal oxide(s) are in the range of 0.01–20 microns, and (3) 98–15% by weight of an aqueous medium, wherein said (meth)acrylamide or (meth)acrylamide derivative(s) (I) or (II) dissolve in said aqueous medium to form a solution, said water insoluble particulate metal oxide(s) being dispersed in said aqueous medium solution, and wherein polymerization of said aqueous medium solution produces an aqueous gel containing said particulate metal oxide dispersed therein.

10. A gel-forming composition consisting of:
(1) 1–40% by weight (meth)acrylamide or (meth)acrylamide derivative(s) each represented by the following formula (I)

(I)

wherein $R_1$ is a hydrogen atom or a methyl group, $R_2$ is a hydrogen atom, a methyl group or an ethyl group, and $R_3$ is a hydrogen atom, a methyl group, an ethyl group or a propyl group, or formula (II)

(II)

wherein $R_1$ is a hydrogen atom or a methyl group, and A is $-(CH_2)_n-$ where n is 4–6, or A is $-(CH_2)_2-O-(CH_2)_2-$, (2) 1–45% by weight particulate metal oxide(s), wherein the particle diameters of said particulate metal oxide(s) are in the range of 0.01–20 microns, and (3) 98–15% by weight of an aqueous medium, (4) 0.05–10% by weight of a photopolymerization initiator, wherein said (meth)acrylamide or (meth)acrylamide derivative(s) (I) or (II) dissolve in said aqueous medium to form a solution, said water insoluble particulate metal oxide(s) being dispersed in said aqueous medium solution, and wherein polymerization of said aqueous medium solution produces an aqueous gel containing said particulate metal oxide dispersed therein.

11. The gel-forming composition of claim 10, wherein said photopolymerization initiator is 2-hydroxy-2-methyl-1-phenylpropan-1-one.

* * * * *